US005798732A

United States Patent [19]
Eshenbach

[11] Patent Number: 5,798,732
[45] Date of Patent: Aug. 25, 1998

[54] GPS RECEIVER HAVING A FAST TIME TO FIRST FIX

[75] Inventor: Ralph F. Eshenbach, Woodside, Calif.

[73] Assignee: Trimble Navigation Limited, Sunnyvale, Calif.

[21] Appl. No.: 716,112

[22] Filed: Sep. 19, 1996

[51] Int. Cl.$^6$ .............................. H04L 27/30; H04B 7/185
[52] U.S. Cl. ..................... 342/357; 342/352; 701/213
[58] Field of Search ................................ 342/357, 352; 701/213

[56] References Cited

U.S. PATENT DOCUMENTS

| 5,323,164 | 6/1994 | Endo | 342/357 |
| 5,402,442 | 3/1995 | Ishigaki | 342/357 X |
| 5,635,940 | 6/1997 | Hickman et al. | 342/357 X |
| 5,663,735 | 9/1997 | Eshenbach | 342/357 |

*Primary Examiner*—George M. Dombroske
*Assistant Examiner*—Joseph L. Felber

*Attorney, Agent, or Firm*—David R. Gildea

[57] ABSTRACT

A global positioning system (GPS) receiver and a method having a fast time to first fix (TTFF) using GPS signal Doppler frequency shifts for correcting the local clock time and using information for an expected GPS message for synchronizing the corrected local clock time to GPS time. The GPS receiver includes radio frequency (RF) circuitry for receiving and downconverting a spread spectrum GPS satellite signal, a correlator for despreading the downconverted GPS signal and providing a GPS bit stream, a clock for providing a local time, and a processor including an executable code. The executable code includes a Doppler correction code for improving the accuracy of the local time by comparing a measured and a calculated Doppler frequency shift for the GPS satellite signal from three or more GPS satellites, and a GPS synchronization code for synchronizing the local time so that the timing of a replica bit stream based upon information for an expected GPS message matches the timing a GPS bit stream received in the GPS satellite signal.

16 Claims, 3 Drawing Sheets

GPS RECEIVER HAVING A FAST TIME TO FIRST FIX

BACKGROUND OF THE INVENTION

1. Field of the Invention

The invention relates generally to GPS receivers and more particularly to a GPS receiver and a method using Doppler frequency shift of a GPS signal and time synchronization with a GPS message for obtaining a fast time to first fix (TTFF).

2. Description of the Prior Art

Global positioning system (GPS) receivers are used in many applications for providing a geographical location fix where a fast time to first fix (TTFF), defined as a time for the GPS receiver to turn on after having been in a standby mode for hours or days and to provide a first geographical location fix, is desirable. To provide the location fix, the GPS receiver must first acquire a GPS satellite signal from one or more GPS satellites. The GPS satellite signal from each GPS satellite includes GPS data bits modulated by a distinct pseudorandom noise (PRN) code. The distinct PRN code enables the GPS receiver to distinguish the GPS satellite signal from one GPS satellite from the GPS satellite signal from another GPS satellite. The GPS data bits are organized into a frames of fifteen hundred bits. Each frame is subdivided into five subframes of three hundred bits each. All of the information needed for the GPS receiver to calculate its geographical location is included in the frame.

Typically, when the GPS receiver is first turned on, it knows its own approximate location, an approximate local clock time, and an almanac or ephemeris information for the locations-in-space of the GPS satellites as a function of time. The GPS receiver processes its location, the approximate local clock time, and the almanac or ephemeris information to determine which of the GPS satellites should be in-view and generates a GPS replica signal having one or more pseudorandom noise (PRN) codes that match one or more PRN codes of the in-view GPS satellites. The GPS satellite signal is acquired by synchronizing (correlating) a frequency and a phase of the GPS replica signal to a frequency and a phase of the GPS satellite signal. When correlation is achieved the GPS receiver monitors the GPS data bits until a start of a subframe is recognized. When the start of the subframe is recognized, the GPS receiver reads the GPS data bits in a hand over word (HOW) to learn a GPS-based clock time. A current precise location-in-space of the GPS satellite is calculated from the GPS-based clock time and the ephemeris information. The GPS-based clock time and the phase of the GPS replica signal is used to calculate a pseudorange from the location of the GPS receiver to the GPS satellite. The geographical location fix is derived by solving four simultaneous equations having the locations-in-space and the pseudoranges for four or more GPS satellites.

A limitation in the existing GPS receivers is that they must monitor the GPS data bits for about nine seconds to recognize the start of two consecutive subframes in order to determine the GPS-based clock time. This monitoring time may add significantly to the TTFF in certain situations. One solution for eliminating the monitoring time is to use an atomic clock as a time standard in the GPS receiver. However, atomic clocks are costly, large, and have a high power consumption. Another solution disclosed by Eschenbach in U.S. Pat. No. 5,663,735 for a "GPS Receiver using a Radio Signal for Improving Time to First Fix" uses a time standard signal such as WWV and then synchronizes the clock time to a transition of a GPS data bit. However, the radio receiver used by Eschenbach also adds to the cost, size, and power consumption of the GPS receiver. Yet another solution described by Gildea in U.S. patent application Ser. No. 08/678573 for a "GPS Receiver Using Data Bit Timing to Achieve a Fast Time to First Fix" uses a temperature sensor and/or learn mode to compensate for time drift that has occurred in clock time during a standby mode and then synchronizes to a GPS data bit transition. However, the length of time for the standby mode in Gildea is limited by the rate of time drift of the local clock time and the precision of the compensation.

What is needed is an improved GPS receiver and a method having a fast time to first fix after a long standby time without adding significantly to the cost, size, and power consumption of an existing GPS receiver.

SUMMARY OF THE INVENTION

It is therefore an object of the present invention to provide a GPS receiver and a method having a fast time to first fix (TTFF) without decoding GPS time from the GPS signal by aligning a locally generated approximate clock time to a global positioning system (GPS) time by synchronizing a locally generated replica bit stream including an expected GPS message with a GPS message received in a GPS signal.

Another object is provide a GPS receiver and a method having a TTFF by improving the accuracy of a locally generated approximate clock time according to a difference between a calculated and a measured Doppler frequency shift of a GPS signal.

Briefly, in a preferred embodiment, the GPS receiver includes radio frequency (RF) circuitry for receiving and downconverting a spread spectrum GPS satellite signal, a correlator for despreading the downconverted GPS signal and providing a GPS bit stream including a GPS message, a clock for providing a local clock time to the correlator, and a processor including a variable memory and an executable code. The executable code includes a Doppler correction code for improving the accuracy of the local clock time according to a difference between a measured and a calculated Doppler frequency shift for the GPS satellite signal by computing a clock time where the calculated and measured Dopplers are the same, and a GPS synchronization code for aligning the local clock time to a GPS-based clock time by generating a replica bit stream including an expected GPS message and synchronizing the replica bit stream with the GPS bit stream.

An advantage of a GPS receiver and a method of the present invention is that a fast TTFF is achieved by synchronizing a locally generated replica bit stream including an expected GPS message with a GPS message received in a GPS signal without the time delay of waiting for a GPS time to be broadcast in a GPS signal.

Another advantage of a GPS receiver and a method of the present invention is that a fast TTFF is achieved by improving the accuracy of a locally generated approximate clock time according to a difference between a calculated and a measured Doppler frequency shift of a GPS signal.

These and other objects and advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
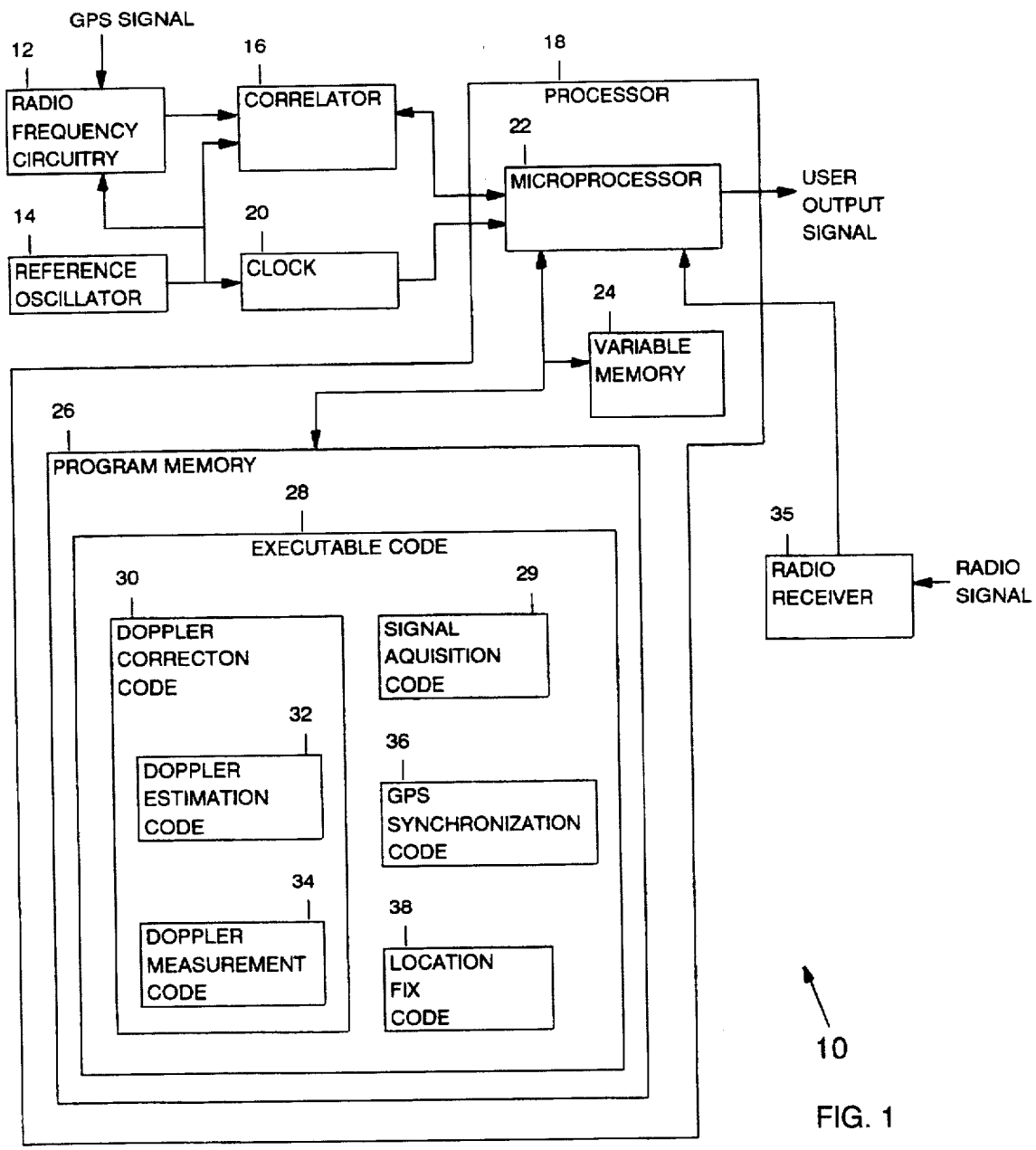
FIG. 1 is a block diagram of a global positioning system (GPS) receiver of the present invention having a fast time to first fix (TTFF)

FIG. 1 is a block diagram of the present invention of a global positioning system (GPS) receiver referred to herein by the general reference number 10. The GPS receiver 10 includes radio frequency (RF) circuitry 12 for receiving a spread spectrum GPS signal broadcast simultaneously from multiple GPS satellites and using a frequency based upon a reference signal generated by a reference oscillator 14 for downconverting the GPS signal to a frequency that is suitable for digital signal processing. The GPS signal includes a carrier signal that is modulated with a GPS bit stream at a fifty data bits per second (BPS) rate (twenty milliseconds per bit) that is spread by a coarse/acquisition (C/A) PRN code sequence at a 1.023 megahertz rate (one microsecond per chip) that is 1023 chips long (one millisecond). Each of the GPS satellites has a distinct PRN code that enables the GPS receiver to distinguish the GPS signal of one GPS satellite from the GPS signal of another GPS satellite. The data bits carry a GPS message of location-determination information that is used by the GPS receiver 10 for computing a GPS-based clock time and a GPS-based geographical location and velocity. The GPS message is organized into sub-frames that are three hundred bits and six seconds in length. Each sub-frame includes an eight bit TLM preamble for subframe synchronization and a hand over word (HOW) that includes information for the GPS time-of-emission for the start of the first data bit of the next subframe. Five subframes make up a frame having a length of fifteen hundred bits or thirty seconds. The first subframe includes corrections for the clock time used by the GPS satellite, the second and third subframes include ephemeris information for the location-in-space of the GPS satellite as a function of time, the fourth and fifth subframes include almanac and health information for all the GPS satellites on a rotating basis. Twelve and one-half minutes are required to rotate through all of the GPS satellites. A more complete description of the GPS signal is given in a "GPS Interface Control Document ICD-GPS-200, NAVSTAR GPS Space Segment and Navigation User Interfaces" available from several sources including Navtech Seminars & Navtech Book and Software Store, Arlington, Va., published in July, 1991 and reprinted in February, 1995 which is incorporated herein by reference and a copy of which is included with the present patent application.

The RF circuitry 12 passes the downconverted GPS signal to a correlator 16. The correlator 16 uses the reference signal for generating a replica signal for replicating the downconverted GPS signal, despreads the GPS signal by correlating the replica signal to the GPS downconverted signal, and provides a correlation signal including the GPS bit stream to a processor 18. A clock 20 issues a clock signal having an approximate local clock time using the reference signal as a time base. The processor 18 includes a microprocessor 22 including associated digital hardware, a variable memory 24, and a program memory 26 including an executable code 28 for receiving the GPS bit stream and the clock signal. The processor 18 uses the microprocessor 22 for writing and reading data from the variable memory 24 and executing instructions in the executable code 28 in a conventional manner. In a preferred embodiment the variable memory 24 is a static random access memory (SRAM) and the program memory 26 is electronically programmable read only memory (EPROM). Of course, other types of memories may be used. The executable code 28 includes a signal acquisition code 29 including instructions for providing a feedback adjustment signal including phase and frequency adjustment information to the correlator 16 for driving the phase and frequency of the replica signal to correlate to the phase and frequency of the downconverted GPS signal. When the phase and frequency of the replica signal achieve a correlation threshold with the downconverted GPS signal, the GPS receiver 10 is said to have acquired the GPS satellites and to be tracking the GPS signal. In a preferred embodiment, the correlator 16 includes several hardware channels that are driven in parallel for acquisition and tracking of the GPS signal from several GPS satellites.

The executable code 28 includes a Doppler correction code 30 including a Doppler estimation code 32 and a Doppler measurement code 34. When the GPS receiver 10 powers on or enters an operational mode from a standby mode, the variable memory 24 includes an approximate geographical location and velocity of the GPS receiver 10 from a previous fix and the ephemerides for several GPS satellites left over from a previous time when the GPS receiver 10 was operating or else injected from some other source. The processor 18 executes instructions in the Doppler estimation code 32 for using the ephemerides, the local clock time, the approximate geographical location and velocity, and known GPS orbital parameters for computing a calculated Doppler frequency shift $D_{cn}$ for the local clock time of the GPS signal for each GPS satellite that is in view or is desired for signal acquisition and a Doppler slope $a_n$ for the Doppler frequency shift $D_{cn}$ versus time where subscript "n" is an nth GPS satellite.

When the GPS receiver 10 has acquired the GPS signal from at least two GPS satellites the processor 18 executes instructions in the Doppler measurement code 34 for using the frequency adjustment information for determining a measured Doppler frequency shift $D_{mn}$ for the GPS signal for the GPS satellites whose signals have been acquired. The processor 18 then executes instructions in the Doppler correction code 30 for finding a time error $\Delta t$ of the local clock time as compared to the GPS-based clock time by solving an equation 1, below, simultaneously for the n GPS satellites that have been acquired:

$$D_{mn} = D_{cn} + a_n \Delta t + \Delta f \qquad (1)$$

where $\Delta f$ is a frequency error of the reference signal as compared to a frequency of the GPS signal. Because the calculated Doppler frequency shift $D_{cn}$ and Doppler slope $a_n$ are themselves a weak function of time, the solution of the simultaneous equation 1 may need to be iterated when the time error $\Delta t$ is computed to be greater than a few hundred milliseconds. The local clock time is then corrected by the time error $\Delta t$ for providing a Doppler-corrected local time. Acquisition of only two GPS satellites is required for solving for the two unknowns, frequency error $\Delta f$ and time error $\Delta t$. However, acquisition of three or more GPS satellites is preferred for an over-determined solution in order to improve the accuracy of the Doppler-corrected local time and for estimating a residue for the time error $\Delta t$.

The variable memory 24 further includes information for an expected GPS message based upon information retained from a previous operational mode or received in a radio signal with a radio receiver 35. The radio receiver 35 may take the form of a cellular telephone, an FM subcarrier information broadcast receiver, a satellite signal receiver, a receive only radio receiver, or a two-way radio communications receiver but is not limited to any one of these types. Optionally, the radio receiver 35 may be integrated with a radio transmitter for reporting the GPS-based geographical location or other information from the site of the GPS receiver 10. The total number of bits in the GPS messages for twenty-five of the GPS satellites is approximately thirty-seven thousand five hundred bits. Some portions of the GPS message, such as the ephemerides must be replaced each fifteen minutes to a few hours. The executable code 28 further includes a GPS synchronization code 36 including instructions for using the expected GPS message for (i) using the residue of the time error $\Delta t$ for estimating a time accuracy of the Doppler-corrected local time, (ii) generating a replica bit stream corresponding to a portion of the GPS message that is within the estimated time accuracy, (iii) comparing the replica bit stream against the GPS bit stream, and (iv) aligning the Doppler-corrected local time so that the replica bit stream synchronizes with the GPS bit stream. When the estimated time accuracy is less than ten milliseconds the GPS synchronization code 36 corrects the Doppler-corrected local time to the closest increment of twenty milliseconds at the time-of-arrival of a last received or a next GPS data bit. When the estimated time accuracy is ten milliseconds or greater the bit synchronization code 36 generates the replica bit stream having one bit plus one additional bit for each additional twenty milliseconds of the estimated time accuracy. For example, when the estimated time accuracy is one hundred twenty milliseconds, the replica bit stream includes seven bits. The GPS synchronization code 36 then corrects the Doppler-corrected local time to the closest increment of twenty milliseconds and corrects the Doppler-corrected local time for the GPS data bits in the GPS bit stream having the same bit pattern as the replica bit stream. A FIG. 3 described below diagrams the example for a time relationship between the GPS bit stream having the GPS-based clock time and the replica bit stream having the Doppler-corrected (local) clock time. When Doppler-corrected local time is not available the bit synchronization code 36 can use local time or local time corrected by some other method as the starting time for determining GPS time.

A location fix code 38 in the executable code 28 includes instructions for computing the GPS-based geographical location fix and velocity and of the GPS receiver 10 and the GPS-based clock time by solving four or more simultaneous equations having the locations-in-space of four or more GPS satellites calculated from their ephemerides and pseudoranges from the GPS receiver 10 to each of the four or more GPS satellites. The processor 18 issues the GPS-based location, velocity and clock time in a user output signal or signals.

Figure 2:
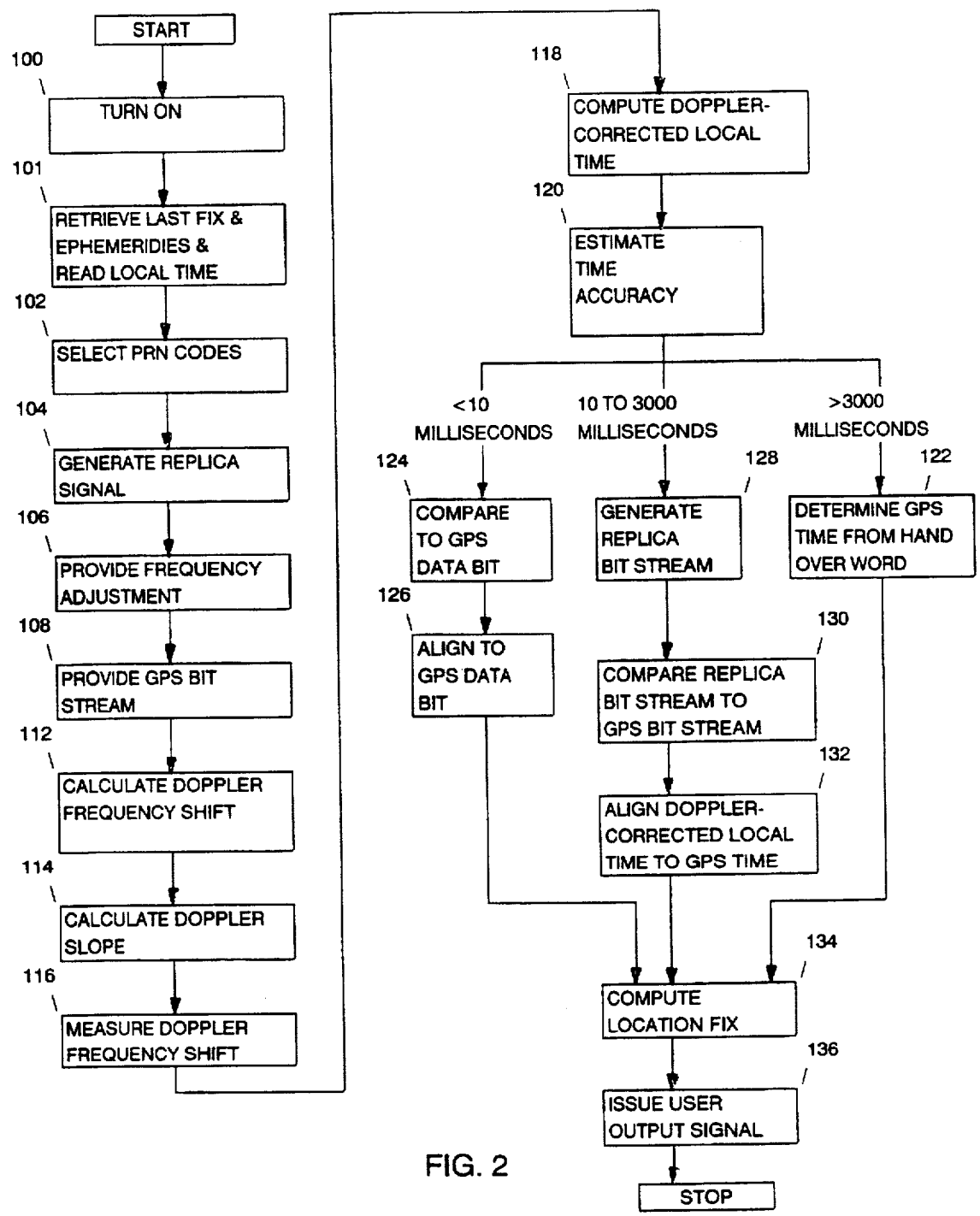
FIG. 2 is a flow chart of a method in the GPS receiver of FIG. 1 for providing a fast TTFF.

FIG. 2 is a flow chart of a method in the GPS receiver 10 for finding the first geographical location fix. At the start the GPS receiver 10 is off or in a standby mode. The variable memory 24 retains information for the current ephemerides for the GPS satellites and the last fix including the geographical location and velocity of the GPS receiver 10 and the GPS time for the last location. The reference oscillator 14 is providing the reference signal and the clock 20 is providing the clock signal including the approximate locally generated local clock time.

At a step 100 the GPS receiver 10 is turned on or switched to an operational mode. At a step 101 the processor 18 retrieves the last fix information and ephemerides from the variable memory 24 and reads the local clock time from the clock 20. At a step 102 the processor 18 uses the retrieved information for selecting the PRN code or codes for acquiring the GPS signal. At a step 104 the correlator 16 receives the PRN code information and the reference signal from the reference oscillator 14 and generates the replica signal for the selected PRN codes using the reference frequency as a time base. At a step 106 the correlator 16 receives the downconverted GPS signal and provides a correlation signal for the correlation of the phase and frequency of the replica signal to the GPS signal. The processor 18 receives the correlation signal and provides the feedback adjustment signal to drive the phase and frequency of the replica signal to correlate to the GPS signal. At a step 108 the correlation of the replica signal and the GPS signal achieves the correlation threshold and the correlator 16 provides the GPS bit stream to the processor 18. The GPS receiver 10 has now acquired the GPS signal and is tracking the GPS satellite. Preferably, the correlator 16 includes multiple channels for acquiring the GPS signal from several GPS satellites.

In a step 112 the processor 18 executes instructions in the Doppler estimation code 32 for computing the calculated Doppler frequency shift $D_{cn}$ for the nth GPS satellite from the last fix information, the ephemerides of the GPS satellite, and the local clock time. At a step 114 the processor 18 executes instructions in the Doppler estimation code 32 for calculating the Doppler slope $a_n$ for the nth GPS satellite versus time at the local clock time. At a step 116 the processor 18 executes instructions in the Doppler measurement code 34 for using the frequency adjustment for correlating the replica signal to the GPS signal for determining a measured Doppler frequency shift $D_{mn}$ for the nth GPS satellite. At a step 118, the processor 18 executes instructions in the Doppler correction code 30 for calculating a Doppler-corrected local time. Preferably the Doppler frequency shifts from three or more GPS satellites are used in the calculation.

In a step 120 the processor 18 executes instructions in the GPS synchronization code 36 for estimating the accuracy of the Doppler-corrected local time. When the estimated time accuracy is greater than three thousand milliseconds, the processor 18 monitors the GPS bit stream in a conventional manner to decode the GPS-based time from the hand over word (HOW) in a step 122. When the estimated time accuracy is less than ten milliseconds, in a step 124 the GPS synchronization code 36 instructs the processor 18 for comparing the local time clock to the time-of-arrival of the last received or the next GPS bit in the GPS bit stream. In a step 126 the GPS synchronization code 36 instructs the processor 18 to align the local clock time to the closest increment of twenty milliseconds at the time-of-arrival of the last or next GPS data bit and proceeding to a step 134. When the estimated time accuracy is ten milliseconds to three thousand milliseconds, the GPS synchronization code 36 instructs the processor 18 for generating the replica bit stream having a length of one bit for the first ten milliseconds plus one additional bit for each additional twenty milliseconds of the estimated time accuracy. At a step 130 the GPS synchronization code 36 instructs the processor 18 for comparing the replica bit stream against the GPS bit stream. At a step 132 the GPS synchronization code 36 instructs the processor 18 for aligning the Doppler-corrected local time so that the replica bit stream synchronizes with the GPS bit stream.

In the step 134 the processor 18 executes instructions in the location fix code 38 to compute the GPS-based geographical location, velocity, and time for the GPS receiver 10. In a step 136, the processor issues the GPS-based location, velocity, and time in a user output signal.

Figure 3:
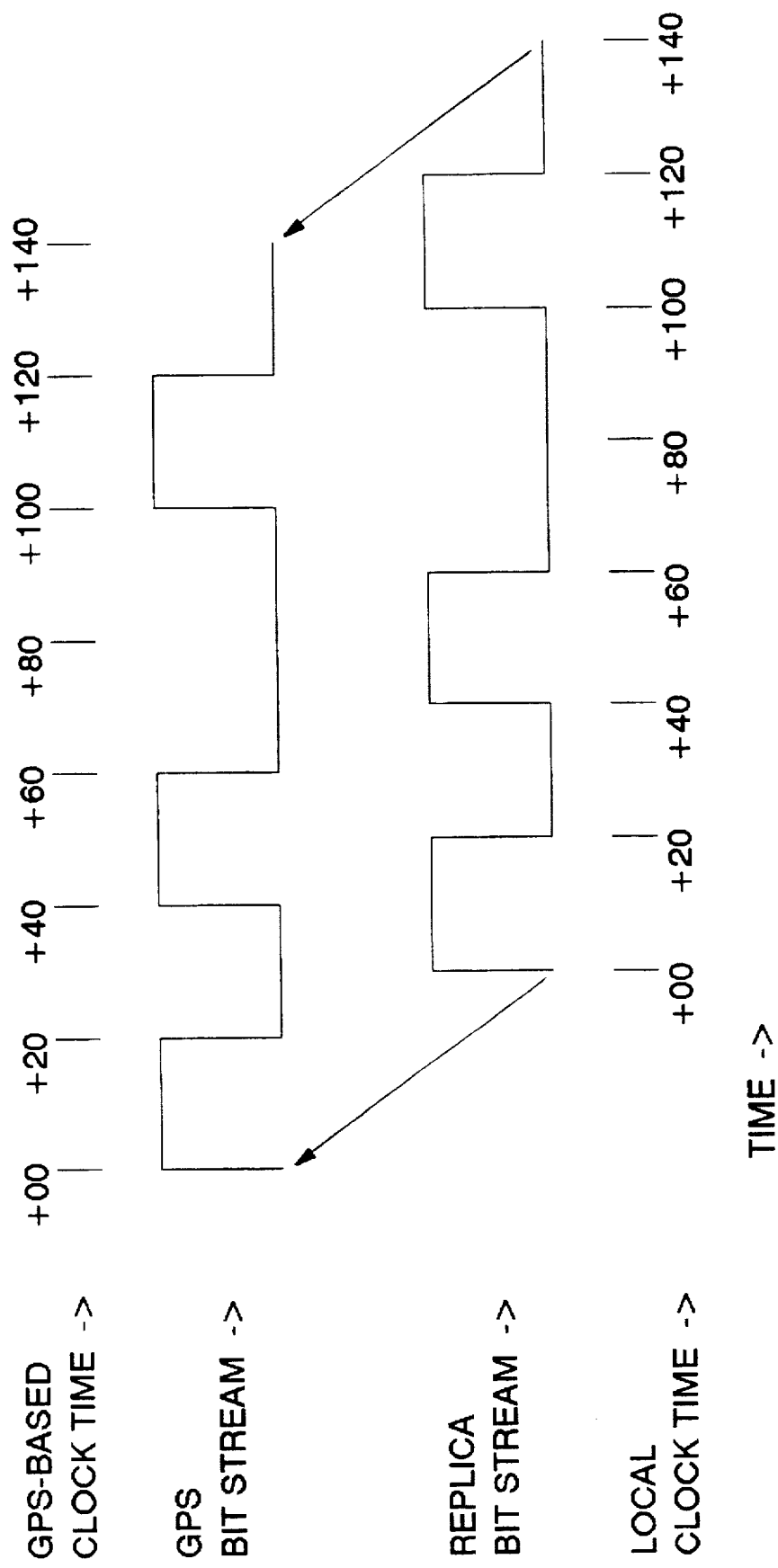
FIG. 3 is a time diagram illustrating a relationship between a local clock time and a GPS-based clock time in the GPS receiver of FIG. 1.

FIG. 3 illustrates a time diagram of a relationship between the local clock time and the GPS-based clock time. The bits of the GPS bit stream have a time-of-emission from the GPS satellite that is synchronized at twenty millisecond intervals starting at 00 hours, 00 minutes, 00 seconds, and 000 milliseconds each day to GPS time. The bits of the replica bit stream are synchronized at twenty millisecond intervals to the local or the corrected local clock time. The processor 18 executes instructions in the GPS synchronization code 36 for adjusting the local or corrected local clock time so that the replica bit stream is aligned with the GPS bit stream, thereby, synchronizing the local or corrected local clock time to GPS time with a time-of-transmission delay between the time-of-emission and the time-of-arrival of the GPS signal. The FIG. 3 illustrates an example for a seven bit replica bit stream and a synchronization correction of thirty milliseconds. The absolute value of the GPS-based clock time is later determined by solving the simultaneous pseudorange equations according to instructions in the location fix code 38.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A global positioning system (GPS) receiver, comprising:

a correlator for despreading a GPS signal including a GPS bit stream including a GPS message synchronized to a GPS clock time and providing said GPS bit stream;

a clock for providing an approximate local clock time;

a processor including a variable memory for storing an expected GPS message and a program memory including an executable code for receiving said GPS bit stream and executing said executable code; and a GPS synchronization code for inclusion in said executable code for generating a replica bit stream including said expected GPS message having a timing based upon said local clock time and for aligning said local clock time to said GPS time for providing a GPS-based clock time by adjusting said local clock time to synchronize said replica bit stream to said GPS bit stream.

2. The GPS receiver of claim 1, further including:

a location fix code for inclusion in said executable code for using said GPS-based clock time for finding a first geographical location fix.

3. The GPS receiver of claim 1, further including:

a radio receiver for receiving a radio signal including information for said expected GPS message and for providing said information to the processor for storage in said variable memory.

4. The GPS receiver of claim 1, further including:

a Doppler correction code for inclusion in said executable code for improving an accuracy of said local clock time by adjusting said local clock time according to a difference between a calculated Doppler frequency shift and a measured Doppler frequency shift for said GPS signal and providing a Doppler corrected local time.

5. A global positioning system (GPS) receiver, comprising:

a correlator for despreading a GPS signal including a GPS bit stream and providing said GPS bit stream;

a clock for providing an approximate local clock time;

a processor including a program memory including an executable code for receiving said GPS bit stream and executing said executable code; and a Doppler correction code for inclusion in said executable code for improving an accuracy of said local clock time by adjusting said local clock time according to a difference between a calculated Doppler frequency shift and a measured Doppler frequency shift for said GPS signal and providing a Doppler-corrected local time.

6. The GPS receiver of claim 5, further including:

a location fix code for inclusion in said executable code for using said Doppler-corrected local time for finding a first geographical location fix.

7. The GPS receiver of claim 5, further including:

a variable memory coupled to the processor for storing an expected GPS message; and a GPS synchronization code for inclusion in said executable code for generating a replica bit stream including said expected GPS message having a timing based upon said local clock time and for aligning said local clock time to said GPS time for providing a GPS-based clock time by adjusting said local clock time to synchronize said replica bit stream to said GPS bit stream.

8. The GPS receiver of claim 7, further including:

a radio receiver for receiving a radio signal including information for said expected GPS message and for providing said information to the processor for storage in said variable memory.

9. A method in a global positioning system (GPS) receiver for receiving a spread spectrum GPS signal including a GPS bit stream including a GPS message synchronized to a GPS time, comprising steps of:

despreading said GPS signal for providing said GPS bit stream;

generating an approximate local clock time;

retrieving information for an expected GPS message from a memory;

generating a replica bit stream including said expected GPS message having a timing based on said local clock time; and aligning said local clock time to said GPS time for providing a GPS-based clock time by adjusting said local clock time to synchronize said replica bit stream to said GPS bit stream.

10. The method of claim 9, further including a step of:

finding a first a geographical location fix by using said GPS-based clock time.

11. The method of claim 9, further including a step of:

improving an accuracy of said local clock time by adjusting said local clock time according to a difference between a calculated Doppler frequency shift and a measured Doppler frequency shift for said GPS signal and providing a Doppler-corrected local time.

12. The method of claim 9, further including a step of: receiving a radio signal including information for said expected GPS message for storage in said memory.

13. A method in a global positioning system (GPS) receiver for receiving a spread spectrum GPS signal including a GPS bit stream including a GPS message synchronized to a GPS time, comprising steps of:

despreading said GPS signal for providing said GPS bit stream;

generating an approximate local clock time; and improving an accuracy of said local clock time by adjusting said local clock time according to a difference between a calculated Doppler frequency shift and a measured Doppler frequency shift for said GPS signal and providing a Doppler-corrected local time.

14. The method of claim 13, further including a step of:

finding a first geographical location fix by using said Doppler-corrected local time.

15. The method claim 13, further including a step of:

retrieving information for an expected GPS message from a memory;

generating a replica bit stream including said expected GPS message having a timing based on said local clock time; and aligning said local clock time to said GPS time for providing a GPS-based clock time by adjusting said local clock time to synchronize said replica bit stream to said GPS bit stream.

16. The method of claim 15, further including a step of:

receiving a radio signal including information for said expected GPS message for storage in said memory.

* * * * *

UNITED STATES PATENT AND TRADEMARK OFFICE
CERTIFICATE OF CORRECTION

PATENT NO. : 5,798,732
DATED : Aug. 25, 1998
INVENTOR(S) : Ralph F. Eschenbach

It is certified that error appears in the above-identified patent and that said Letters Patent is hereby corrected as shown below:

On the title page ,:

Item [19] delete "Eshenbach" and insert --Eschenbach--

Item [75] delete "Eshenbach" and insert --Eschenbach--

Signed and Sealed this

Sixth Day of July, 1999

Attest:

Q. TODD DICKINSON

*Attesting Officer*   *Acting Commissioner of Patents and Trademarks*